US012645106B2

(12) United States Patent
Luke et al.

(10) Patent No.: US 12,645,106 B2
(45) Date of Patent: Jun. 2, 2026

(54) SINGULATION OF LITHIUM-CONTAINING PHOTONIC DEVICES

(71) Applicant: HyperLight Corporation, Cambridge, MA (US)

(72) Inventors: Kevin Luke, Cambridge, MA (US); Mian Zhang, Cambridge, MA (US); Fan Ye, Lincoln, MA (US); Roy Meade, Austin, TX (US); Christian Reimer, Wellesley, MA (US); Prashanta Kharel, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 180 days.

(21) Appl. No.: 18/125,644

(22) Filed: Mar. 23, 2023

(65) Prior Publication Data

US 2023/0305326 A1 Sep. 28, 2023

Related U.S. Application Data

(60) Provisional application No. 63/429,471, filed on Dec. 1, 2022, provisional application No. 63/323,440, filed on Mar. 24, 2022.

(51) Int. Cl.
*G02F 1/035* (2006.01)

(52) U.S. Cl.
CPC .......... *G02F 1/035* (2013.01); *G02F 2202/20* (2013.01)

(58) Field of Classification Search
CPC ....... G02F 1/035; G02F 1/0353; G02F 1/0356
See application file for complete search history.

(56) References Cited

U.S. PATENT DOCUMENTS

| | | | | |
|---|---|---|---|---|
| 9,746,700 | B2 * | 8/2017 | Anderson | G02F 1/225 |
| 9,823,419 | B1 * | 11/2017 | Pelletier | G02B 6/30 |
| 10,877,352 | B2 * | 12/2020 | Heck | G02F 1/295 |
| 11,353,772 | B1 * | 6/2022 | Chiang | G02F 1/3558 |
| 11,598,980 | B2 * | 3/2023 | Wang | G02F 1/0018 |
| 11,841,559 | B2 * | 12/2023 | Chang | G02F 1/3132 |
| 2018/0019139 | A1 * | 1/2018 | Sun | B05D 1/005 |
| 2019/0086609 | A1 * | 3/2019 | Shaw | H01L 21/67092 |
| 2023/0305326 | A1 * | 9/2023 | Luke | G02F 1/035 |
| 2024/0248332 | A1 * | 7/2024 | Zhu | G02F 1/035 |
| 2025/0208346 | A1 * | 6/2025 | Zhang | G02B 6/125 |

* cited by examiner

*Primary Examiner* — Rhonda S Peace
(74) *Attorney, Agent, or Firm* — Van Pelt, Yi & James LLP

(57) ABSTRACT

An optical device includes a substrate, an oxide layer on the substrate and an electro-optic device on the oxide layer. The oxide layer is at least one micrometer thick. The electro-optic device includes an electro-optic material having a thickness of not more than one micrometer. The silicon substrate, oxide layer, and the electro-optic material terminate at an edge. At least one of the silicon substrate has a thickness of at least five hundred micrometers or the edge includes a recessed region corresponding to a portion of the oxide layer.

21 Claims, 12 Drawing Sheets

SINGULATION OF LITHIUM-CONTAINING PHOTONIC DEVICES

CROSS REFERENCE TO OTHER APPLICATIONS

This application claims priority to U.S. Provisional Patent Application No. 63/429,471 entitled STEALTH DICING DIE SINGULATION filed Dec. 1, 2022, which is incorporated herein by reference for all purposes and U.S. Provisional Patent Application No. 63/323,440 entitled PHOTONIC CHIP UTILIZING STEALTH DICING filed Mar. 24, 2022, which is incorporated herein by reference for all purposes.

BACKGROUND OF THE INVENTION

Photonic devices (e.g. electro-optic devices) typically include one or more waveguides formed using materials having an index of refraction that is sensitive to electric fields. The waveguide(s) carry an optical signal. The electro-optic device also includes electrodes that apply an electric field to an optical modulator portion of the waveguide to alter the index of refraction of the waveguide. As a result, the phase, intensity, and/or polarization of the optical signal traversing the waveguide can be modulated. Other electrical and/or optical components may be formed as part of the device. For example, the waveguide may include mode converter portion(s), splitter portion(s), and/or other coupling portion(s).

Typically, multiple photonic devices are formed on a single substrate. Once fabrication is complete, individual devices are singulated for use. Singulation separates photonic devices and, therefore, defines the edges of the photonic devices. After singulation, for example, photonic devices may be incorporated into a transmitter optical assembly (TOSA), a receiver optical assembly (ROSA), an optical transceiver, or other optical device. Optical signals are desired to be input to and/or output from the photonic device. In some cases, a facet is used to optically couple the photonic device to an optical fiber. The facet is the region of the edge of the photonic device at which the mode is carried. This region typically includes the waveguide and the surrounding area. Consequently, singulation may also be desired to provide a facet that allows for coupling of the optical signal with sufficiently low losses. Although various photonic devices can be fabricated, it may be challenging to provide a photonic device having the desired optical properties in combination with a facet that allows low loss optical coupling to the optical device. Accordingly, improved photonic devices are desired.

BRIEF DESCRIPTION OF THE DRAWINGS

Various embodiments of the invention are disclosed in the following detailed description and the accompanying drawings.

DETAILED DESCRIPTION

Figure 1A:
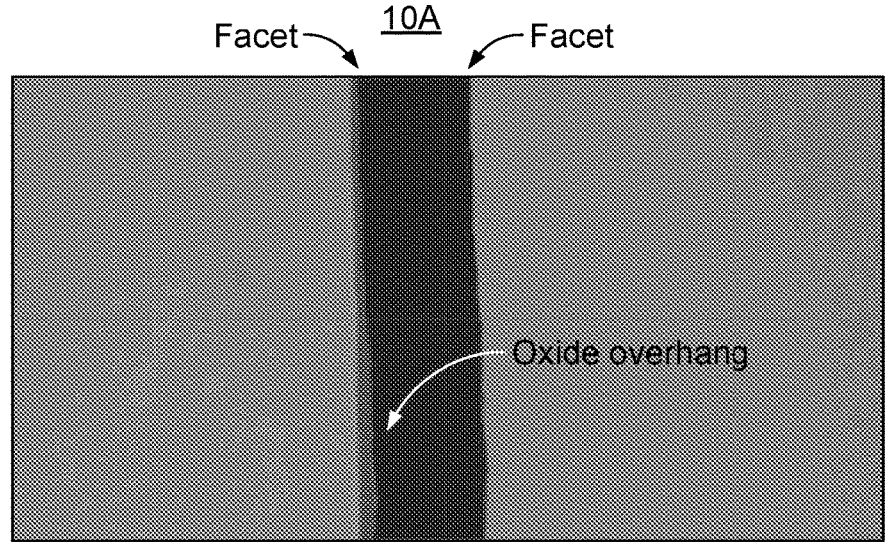
FIGS. 1A-1B depict embodiments of lithium niobate devices singulated using stealth dicing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Photonic devices typically include one or more waveguides formed using electro-optic materials, which have an index of refraction that is sensitive to electric fields. Typically, multiple optical devices are formed on a single substrate. Once fabrication is complete, individual photonic devices are singulated for use. For example, in silicon photonics, the devices may be etched. Typically, the etch is sufficiently deep that any remaining silicon ledge is a particular distance below the top of the photonic device. This particular distance is at least half of the diameter of an optical fiber used to couple optical signals into or out of the silicon photonic device. For example, in silicon photonic devices, the etch is typically fifty micrometers deep or more. As a result, the etch reaches well into the underlying silicon substrate and the optical fiber is not obstructed by the silicon ledge. If the device is not completely etched through, then the singulation is completed. For example, the remaining silicon substrate may be blade diced or diced using a laser.

For other photonic devices, such dicing may not provide an adequate facet. For example, lithium-containing photonic devices may include lithium niobate (LN) and/or lithium-tantalate (LT) as an electro-optic material. Further, such devices may use thin films of the electro-optic material (e.g. thin film LN and/or thin film LT). For example, in some cases, the LN and/or LT layer may be not more than one micrometer thick as-provided. In some embodiments, the LN and/or LT may be not more than five hundred nanometers thick. If used in conjunction with a silicon substrate, such thin film LN and/or LT layers are generally formed on a thick buried oxide (BOX) layer. For example, the BOX layer may be a silicon dioxide layer that is at least three micrometers thick. The BOX layer may be at least three micrometers thick. In some cases, the BOX layer is a silicon dioxide layer that is at least ten micrometers thick. If traditional silicon photonics techniques (e.g. etching the edge, including etching the facet) are employed for such LN and/or LT photonic devices, the resulting etched facet (the physical region at the edge in close proximity to the mode carried by the waveguide and where light enters and/or exits the photonic device) may have a large short-range surface roughness (e.g. one hundred nanometers or more). This large surface roughness may result in large optical losses and render the photonic device unusable. Other techniques may also have issues.

Figure 1B:
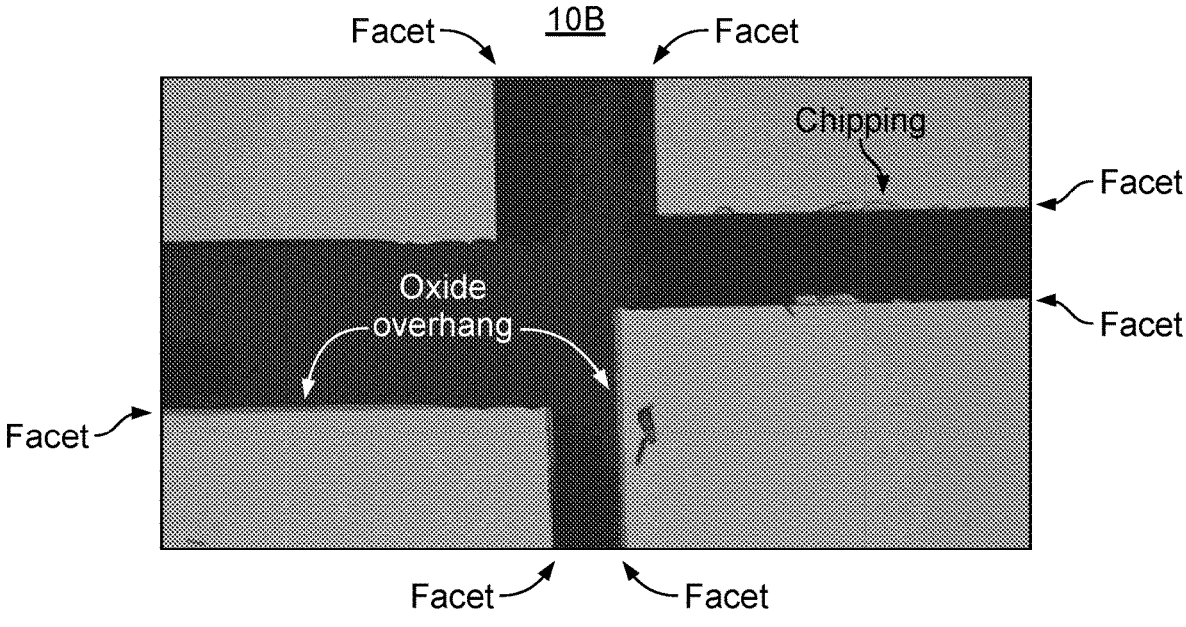

For example, FIGS. 1A-1B are plan views of lithium niobate-containing devices 10A and 10B singulated using stealth dicing. Such devices include a silicon dioxide BOX layer having a thickness of at least one micrometer on a silicon substrate. Other thicknesses of the BOX layer (e.g. at least three micrometers, at least five micrometers, at least seven micrometers or more) are possible. In some embodiments, BOX layers are not thicker than approximately ten micrometers. Further, lithium niobate-containing devices 10A and 10B include a thin film LN layer (e.g. having a thickness of less than one micrometer) and an oxide cladding layer. In some cases, the oxide cladding layer is one micrometer of silicon dioxide. In some cases, stealth dicing results in overhang of the BOX layer (labeled "oxide overhang" in LN-containing devices 10A and 10B). This is undesirable. Further, chipping (labeled "chipping" in LN-containing device 10B) may also occur. In some cases, the cladding layer may chip during the stealth dicing process. This is also undesirable. Further, the location of the oxide overhang and/or chipping may be unpredictable. As a result, the yield for such lithium niobate-containing devices may be poor.

Figure 2:
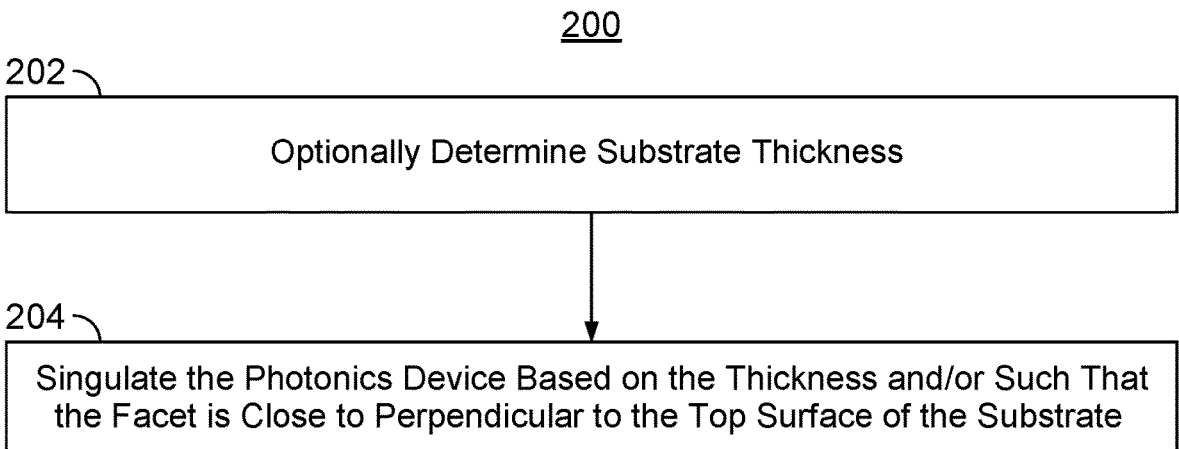
FIG. 2 is a flow-chart depicting an embodiment of a method for singulating a photonic device.

FIG. 2 is a flow-chart illustrating an embodiment of a method for fabricating a photonic device. At least a portion of method 200 may be considered to start after the electro-optic device has been fabricated. For example, for an optical modulator, the waveguide (including mode converters and/or any passive optical components) and electrodes have been provided. The waveguide includes or consists of electro-optic material(s). In some embodiments, the electro-optic material(s) used are nonlinear. As used herein, an electro-optic material exhibits the electro-optic effect and may have an effect that is at least (e.g. greater than or equal to) 5 picometer/volt. In some embodiments, the electro-optic material has an effect that is at least 10 picometer/volt. In some such embodiments electro-optic material has an effect of at least 20 picometer/volt. The electro-optic material experiences a change in index of refraction in response to an applied electric field. In some embodiments, the electro-optic material is ferroelectric. In some embodiments, the electro-optic material effect includes a change in index of refraction in an applied electric field due to the Pockels effect. Thus, in some embodiments, electro-optic materials possessing the electro-optic effect in one or more the ranges described herein are considered electro-optic materials regardless of whether the effect is linearly or nonlinearly dependent on the applied electric field. The electro-optic material may be a non-centrosymmetric material. Therefore, the electro-optic material may be piezoelectric. In some embodiments, the electro-optic material(s) include one or more of lithium niobate (LN), lithium tantalate (LT), potassium niobate, gallium arsenide, potassium titanyl phosphate, lead zirconate titanate, and barium titanate. Thus, in some embodiments, the photonic device includes lithium (e.g. the electro optic material(s) used are LN and/or LT). In other embodiments, other electro-optic materials having analogous optical characteristics may be used. In some embodiments, the electro-optic material(s) used are thin films. For example, the photonic device may be a thin film LN (TFLN) or a thin film LT (TFLT) device. Thus, the electro-optic materials may have a thickness prior to fabrication of the waveguide of less than one micrometer. In some embodiments, the thickness is not more than eight hundred nanometers. In some such embodiments, the thickness may be not more than five hundred nanometers. The final thickness of the waveguide and/or other structures formed using the electro-optic material may be less. For example, a ridge waveguide may be formed in which the slab portion has a thickness of not more than two hundred nanometers and the ridge portion has a height of not more than two hundred nanometers. Other thickness(es) and/or height(s) are possible.

In addition to the electro-optic material(s), the photonic devices include a substrate structure. The substrate structure includes an underlying substrate, such as silicon. For many electro-optic materials, such as LN and/or LT, the substrate structure also includes a thick BOX layer. For example, in some embodiments, the BOX layer is at least one micrometer or at least three micrometers of silicon dioxide. In some embodiments, the BOX layer is at least five micrometers of silicon dioxide. In some embodiments, the BOX layer is at least seven micrometers of silicon dioxide. The BOX layer may be at least ten micrometers of silicon dioxide. In some embodiments, the BOX layer is not more than fifteen micrometers thick. In some such embodiments, the BOX layer is not more than ten micrometers thick. Other thicknesses are possible.

The photonic device may also include a layer of cladding on the electro-optic devices (e.g. on at least the waveguide). For example, in some embodiments, a silicon dioxide layer of not more than one micrometer is used. Other thicknesses are possible. Other structures, such as electrodes, other circuitry, and/or other optical components may have been formed.

The thickness of the underlying substrate may be determined, at 202. In some embodiments, 202 includes determining whether the thickness of the substrate is less than a threshold. In some embodiments, the threshold is six hundred micrometers. In some embodiments, the threshold is five hundred and fifty micrometers. In some embodiments, the threshold is five hundred and twenty micrometers. In some embodiments, the threshold is five hundred micrometers. The determination of the thickness at 202 may thus include determining whether the substrate thickness is less than, equal to, or greater than the threshold. In some embodiments 202 may include selection of a particular substrate, for example a silicon wafer having a particular diameter as the substrate. Such wafers generally have a standard thickness that depends upon the diameter of the wafer. In some embodiments, 202 may simply include receiving specifications for a set of photonic devices to be singulated. In such embodiments, the specifications include the thickness of the underlying substrate. In some embodiments, 202 may include thinning the substrate. For example, the substrate may be thinned such that the substrate thickness is less than (or less than or equal to) the threshold. In other embodiments, the substrate may be thinned while ensuring that the thickness of the substrate is greater than the threshold. In other embodiments, 202 may be omitted.

The photonic device is singulated, at 204. Singulating the photonic device at 204 defines the edges of the photonic device. The substrate terminates at the edge. For some edge(s), the electro-optic device (e.g. the waveguide) terminates at the facet(s). The BOX layer may also terminate at the edge. For example, the edge(s) at which an optical signal is coupled into or out of the photonic device (e.g. via a fiber), the waveguide terminates at the facet. In some embodiments, the singulating at 204 is based on the thickness. Thus, the singulation may be performed such that the edge at which the optical signal is to be input or output (e.g. via a fiber) may have recesses for the substrate thickness being less than a threshold (e.g. eight hundred micrometers, seven hundred fifty micrometers, seven hundred micrometers, six hundred micrometers, five hundred fifty micrometers, five hundred twenty micrometers, five hundred micrometers, or four hundred fifty micrometers). In some embodiments, the recesses correspond to trenches formed in the BOX layer. In such embodiments, the recesses may not be present for photonic devices having substrate thicknesses in excess of the threshold (e.g. greater than five hundred micrometers, five hundred and twenty micrometers, five hundred and fifty micrometers, or six hundred micrometers). However, recesses may be present in devices having thicknesses greater than the threshold. The trenches may mitigate issues with singulation, such as the chipping or overhang described herein. Further, the combination of trenches and singulation may improve yield and/or provide greater positional accuracy of the location of the edge of the photonic device. In some embodiments, the singulation performed is such that the edge(s) are close to perpendicular to the surface of the substrate on which the electro-optic device resides. For example, the edge may be at an angle of at least eighty degrees and not more than one hundred degrees from a top surface of the silicon substrate. In some embodiments, this angle is at least eighty-five degrees and not more than ninety-five degrees. In some embodiments, the angle is at least eighty-seven degrees and not more than ninety-three degrees. In some embodiments, the angle is at least eighty-eight degrees and not more than ninety-two degrees. The angle may be at least eighty-nine and not more than ninety-one degrees. In some embodiments, the angle is at least 89.5 degrees and not more than 90.5 degrees. In some embodiments, 204 includes performing stealth dicing.

It has been determined that the singulation, e.g. via stealth dicing, performed in 204 forms edges that are close to vertical (i.e. perpendicular to the top surface of the substrate). Further, the portion of the photonic device at the facet (e.g. the end of the waveguide at the edge and, in some embodiments, the surrounding region that carries the mode) has a low short range surface roughness. The short range surface roughness is for regions having a characteristic length of not more than two micrometers. The short range surface roughness may be for regions having a characteristic length of one micrometer or less. In some embodiments, the short range surface roughness is for regions having lengths of not more than five hundred nanometers. In some embodiments, the short range surface roughness is not more than ten nanometers. In some embodiments, the short range surface roughness is not more than five nanometers. The short range surface roughness of the waveguide at the facet may be not more than four nanometers or not more than two nanometers in some embodiments. In some embodiments, the short range surface roughness is not more than one nanometer, 0.5 nanometer, or 0.4 nanometer. Other short range surface roughnesses are possible. Because of the low short-range surface roughness, optical losses may be reduced. In some embodiments, other components of the photonic device (e.g. the BOX layer) share or are analogous to the surface roughness of the electro-optic material. Further, the presence of overhangs for the BOX layer and/or chipping may be reduced or substantially eliminated. Thus, yield and performance may be improved. Fabrication and performance of photonic devices may thus be improved.

Figure 3:
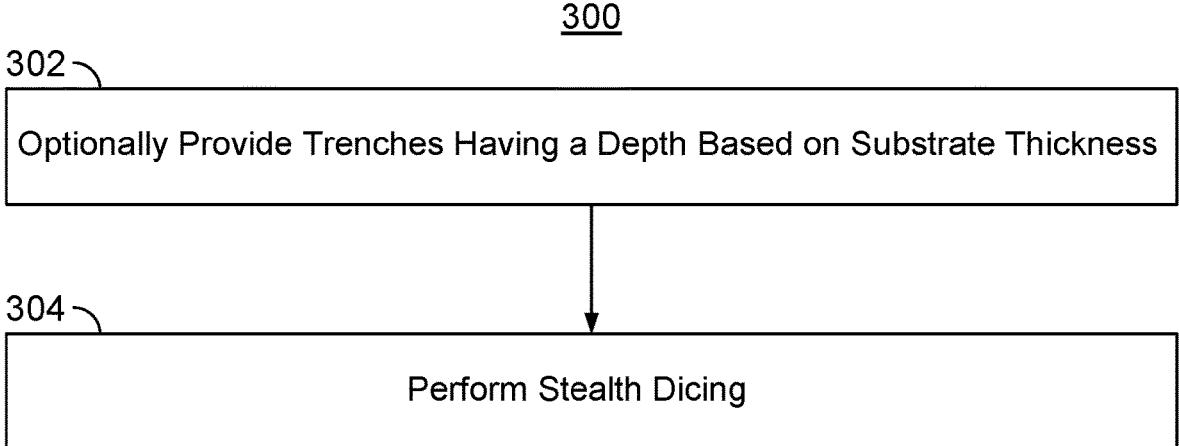
FIG. 3 is a flow-chart depicting an embodiment of a method for singulating a photonic device.

FIG. 3 is a flow chart of an embodiment of a method for singulating a photonic device. Method 300 may be considered to start after the electro-optic device has been fabricated. For example, for an optical modulator, the waveguide (including the optical modulator region, mode converters and/or any passive optical components) and electrodes have been provided. The photonic devices and/or materials used may include or consist of those described with respect to method 200. For example, the photonic devices desired to be singulated may be on a substrate structure that includes a substrate (e.g. silicon) and a BOX layer (e.g. silicon dioxide) having the thickness(es) described herein. The photonic devices also include or consist of the electro-optic material(s) described herein, such as LN and/or LT. In some embodiments, method 300 may be considered to perform process 204 of method 200.

Trenches may optionally be provided based on the thickness of the substrate, at 302. Thus, the photonic devices may be etched to form trenches. In some embodiments, the depth of the trench may depend upon the thickness of the substrate. For example, for substrates that are at least a threshold thickness, the trench may be shallower or have zero depth (i.e. the trench formation of 302 is omitted). The thresholds may be analogous to those described in the context of method 200. In some embodiments, the threshold is five hundred micrometers, five hundred and fifty micrometers, six hundred micrometers, seven hundred micrometers, seven hundred fifty micrometers, or eight hundred micrometers. In some embodiments, the threshold is above five hundred and twenty micrometers. In some embodiments, the trenches are provided regardless of the thickness of the substrate. For example, the trenches may be provided for substrates having a thickness greater than the thresholds described herein. In some such embodiments, the depth of the trench might depend upon the thickness of the substrate and/or the thickness of the BOX layer.

The trenches are provided in the region that the photonic devices are desired to be singulated. The location of the trenches may be considered to form a pattern of perforations (i.e. trenches) for the photonic devices. For example, the trenches may be provided at or near the edge of the street, scribe, or kerf. In some embodiments, the trenches may be provided at or near the chip edge as defined by a reticle/mask. The term "street" may be explained as follows. The chip (photonic device) edges are defined by the reticle. The region between the edges of neighboring photonic devices is the street. In various embodiments, the street can have a 0 width (the edge of one photonic device being coincident with the edge of a neighboring photonic device), but in other embodiments is in the range of 80 micrometers through 100 micrometers. If not separately removed, the street remains part of one of the photonic devices. Placement of the trenches depends on what photonic device the street is to be a part of. For example, suppose trenches are to be placed between two neighboring photonic devices. Photonic device A is on the left, photonic device B is on the right. If the trenches are close to the edge of the street at photonic device A, a clean facet for this edge of photonic device A may be obtained. This may be desirable if a mode converter on photonic device A has an input at this facet. For photonic device B (to the right of photonic device A) after singulating, photonic device B may have the entirety of the street as part of it (the street is now part of the left side of photonic device B. Stated differently, if the facet is desired to be of high quality or a high degree of smoothness (i.e. low short range surface roughness), perforated trenches, for example perforated trenches etched using a laser, may be placed proximal to the photonic device edge to cut off the street on the facet side, while the photonic device on the opposing side has the full street. In some embodiments, the trenches may be positioned down the middle of the street. In some embodiments, the trenches intersect or define the chip edge. Further, the trenches need not reach the silicon substrate. In some embodiments, the trenches are sufficiently deep that a portion of the BOX layer is removed, while a portion of the BOX layer remains. Thus, any cladding, electro-optic material(s), and other layers on the BOX layer in the region of the trench are etched. For example, the depth of the trench in the BOX layer may be at least one micrometer, at least two micrometers, at least three micrometers, or at least five micrometers. In some embodiments, the trench is sufficiently deep to remove all of the BOX layer in the region of the trench. In some embodiments, trenches are not formed in regions in which an optical facet is desired to be formed. Stated differently, the regions of the electro-optic device at which optical signals are desired to be input to or output from are not etched. Further, the locations of the trenches can be selected to improve the smoothness (i.e. reduce the surface roughness) of a facet. For example, trenches may be placed on either side of a waveguide so the facet for the waveguide is smooth from stealth dicing and not etched. The non perforated (trench-free) part of the perforated pattern (trench-no trench-trench) is on the part that is desired to be smooth. In other embodiments, trenches may be roughly constantly spaced apart (e.g., analogous to the pattern of perforated paper).

The photonic devices are singulated via stealth dicing of the substrate, at 304. Stealth dicing includes illuminating multiple layers in the underlying substrate (e.g. a silicon substrate) with a focused laser. The laser may be incident on the silicon substrate from the back side of the substrate or from the front side of the devices. In some embodiments, providing the laser from the back side reduces the requirements related to the separation between photonic devices (e.g. the width of the street between photonic devices). This is because the beam width may be accounted for when illuminating the silicon substrate from the front side. Accounting for the beam with may avoid illuminating (and thus damaging) structures that are part of the photonic device. The beam width need not be accounted for if the substrate is illuminated from the back side. This is because the wider portion of the beam may be at the back side of the substrate where no structures have been formed. The laser illumination locally ablates interior regions of the substrate. This ablation forms defect layers in the silicon substrate in the region the device is to be singulated. In some embodiments, defect layers may be formed in another manner. Once the defect layers are formed, the photonic devices on the substrate are separated. For example, the substrate may be placed on dicing tape. This may occur prior to illumination with the focused laser. The dicing tape may be expanded (i.e. stretched) to separate photonic devices after defect layers have been formed by ablation using the focused laser. The defect layers aid in guiding the cleaved surface to be formed in the desired location. Stated differently, the defect layers may aid in guiding the cleaving to remain in the desired region. Further, use of the trenches may improve the dicing performed. In particular, the trenches may aid in guiding the cleaved surface through layers on top of the substrate (e.g. the BOX layer, electro-optic material(s), and cladding). As part of singulation in 304, additional processing may be performed on the photonics device. For example, in some embodiments, the edges of the photonic device may be etched chemically or in another manner. Such an etch may be used to form an undercut at the edges of the photonic device, to further reduce the surface roughness of the facet or other portion of the edge, or to otherwise tailor the properties of the photonic device.

Method 300 thus allows for singulation of photonic devices having substrates of various thicknesses. Further, the presence of trenches for photonic devices formed on thinner substrates may prevent drifting of the crack or crack meander (i.e. the location at which the underlying substrate is cleaved) away from the desired position of the edge. For thicker substrates, the energy of the crack may be sufficient to reduce or prevent this drift. Further, delamination of layers may be reduced by the presence of the trench. Another benefit of a trench/perforated trench pattern is positional precision. The etch, and thus trench placement, may be precisely controlled with lithography. The trench at this location guides the stealth dicing. Consequently, trench locations also aid in controlling the locations of the edges of the photonic devices being singulated. Thus, the use of the trenches having a depth (and/or presence) that might depend upon the thickness of the substrate may aid in reducing or eliminating overhangs of the BOX layer and/or chipping of the cladding. Consequently, yield for fabrication process 200 and/or 300 may be improved. The locations of the edges of the photonic devices may also be controlled. Photonic device performance may also be improved. As indicated with respect to method 200, the edge(s) formed via method 300 may be very close to vertical. Further, the short range surface roughness of at least the electro-optic materials at the facet may be low. Stated differently, the angle(s) of the edge(s) (and thus the facet) with respect to the top surface of the substrate and/or the short range surface roughness of the electro-optic device may be analogous to those described with respect to method 200. Consequently, the optical losses due to coupling into and/or out of the photonic device may be low. The angle of the edge may also facilitate coupling of the photonic device to an optical fiber. Optical losses may thus be reduced.

Figure 4A:
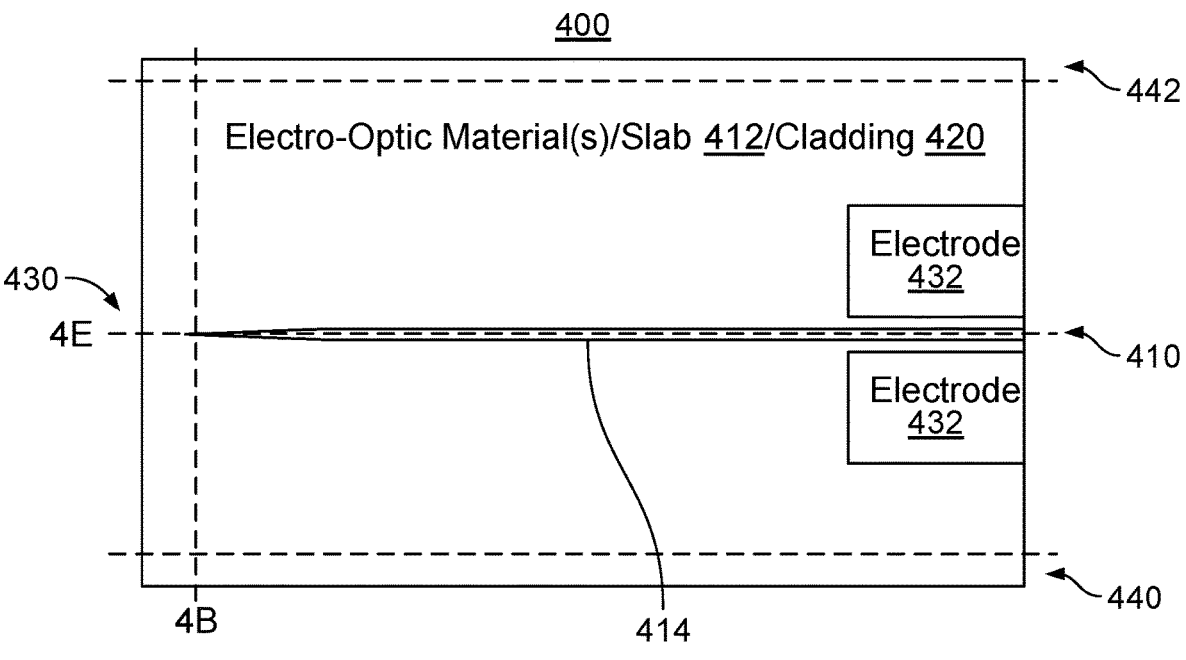
FIGS. 4A-4E are diagrams depicting an embodiment of a photonic device during singulation.
Figure 4B:
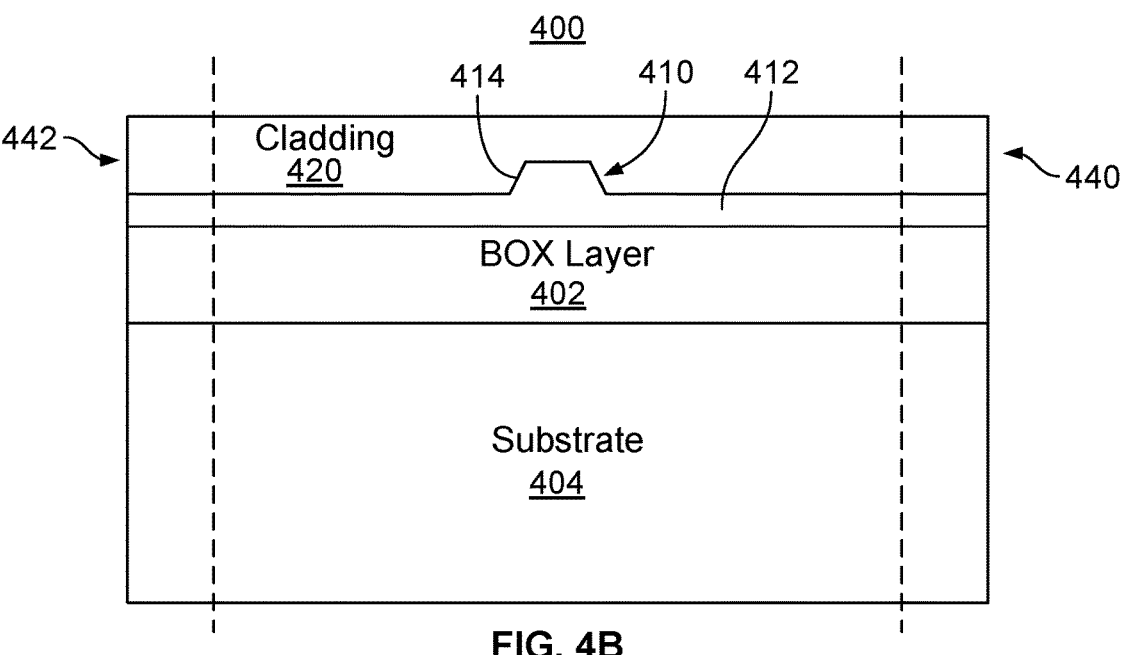
Figure 4C:
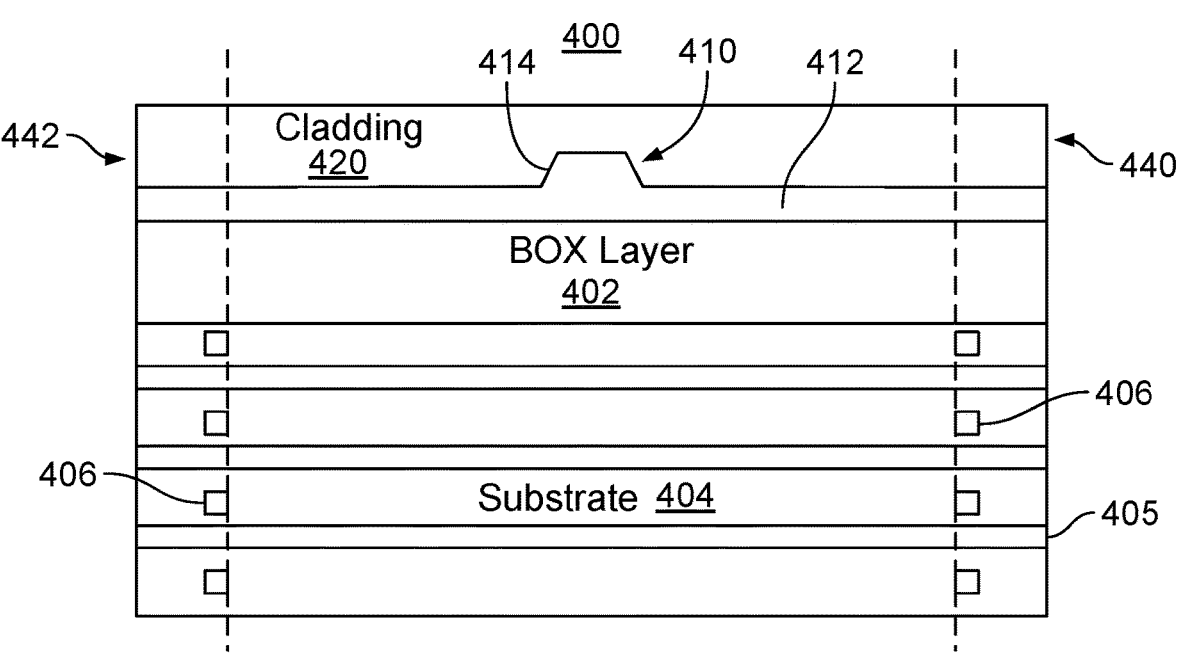
Figure 4D:
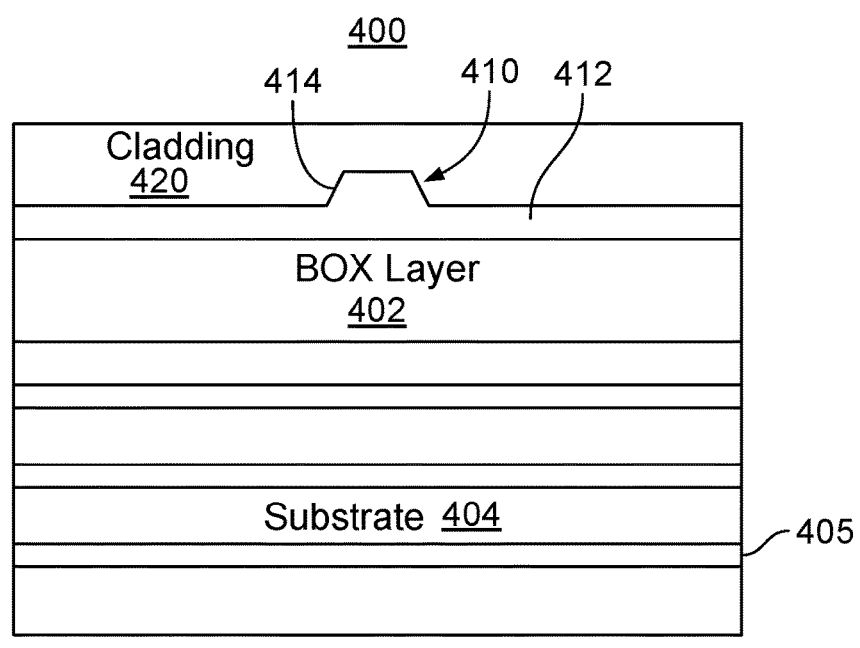
Figure 4E:
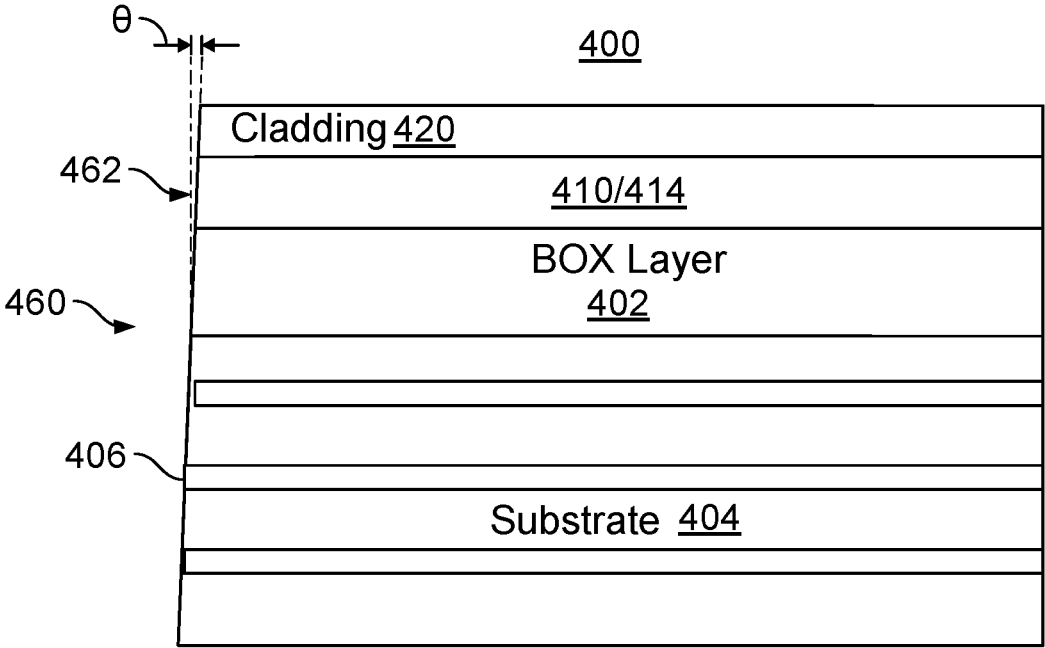

FIGS. 4A-4E are diagrams depicting an embodiment of photonic device 400 during fabrication using method(s) 200 and/or 300. FIGS. 4A and 4B are a plan view and a cross-sectional view of photonic device 400 respectively before stealth dicing starts. FIGS. 4B-4D are cross-sectional views of photonic device 400 taken along line 4B shown in FIG. 4A. FIG. 4E is a cross-sectional view of photonic device 400 taken along line 4E shown in FIG. 4A. For clarity, FIGS. 4A-4E are not to scale and not all components of photonic device 400 are shown.

Photonic device 400 includes a substrate structure including BOX layer 402 and underlying substrate 404, which may be a silicon substrate. Photonic device 400 also includes electro-optic material(s) 410 and cladding 420. Electro-optic material(s) 410 have been formed into ridge waveguide 414 and slab 412. Electro-optic material(s) 410 may include the electro-optic material(s) described herein. For example, electro-optic material(s) 410 may include or consist of LN and/or LT. In some embodiments, the height of ridge 414 is on the order of two hundred nanometers or less and the thickness of slab 412 may be two hundred nanometers or less. In some embodiments, the width of ridge 414 in the region of the surface indicated by line 4B is not more than five hundred nanometers. In some embodiments, the width of ridge 414 in this region is at least one hundred nanometers. Other widths are possible. In some embodiments, slab 412 may terminate before the surface at line 4B. In such embodiments, ridge waveguide 414 may be a channel waveguide at the facet. The thicknesses and material(s) used for substrate 404, BOX layer 402, electro-optic material(s) 410 and cladding 420 are analogous to those described herein. Also shown in FIGS. 4A-4B are electrodes 432 and streets 430. 440, and 442. Streets 430, 440, and 442 are not present in the completed photonic device. In some embodiments, streets 430, 440, and/or 442 may be one hundred micrometers or more in width.

Substrate 404 has a thickness greater than or (in at least some embodiments) equal to the thresholds described herein. For example, in some embodiments, substrate 404 may have a thickness that is greater than five hundred micrometers. Thus, process 302 of method 300 may be omitted. Stated differently, no trenches are formed in photonic device 400. This is because the substrate is sufficiently thick that the cleave formed during stealth dicing may propagate through the remainder of photonic device 400.

FIG. 4C depicts photonic device after stealth dicing or other singulation has commenced at 204 and/or 304. In particular, defect layers 405 (only one of which is labeled) and 406 have been created. In some embodiments, defect layers 405 and 406 have been formed by ablating layer(s) of substrate 404 with a laser or otherwise introducing an instability or weakness in the layer. Defect layers 405 are created in a line along the surface indicated by line 4B, while defect layers 406 are created at the edges of streets 440 and 442. Thus, although termed defect "layers", the regions that are ablated by the laser form a line through the depth of substrate 404. This is more clearly indicated by defect layers 406. In some embodiments, the weakened defect layers may be created using a different technique than laser ablation. Thus, stealth dicing or an analogous technique may be used to dice photonic device 400 in the region of streets 430, 440, and 442.

FIGS. 4D and 4E depict cross-sectional views of photonic device 400 along lines 4B and 4E, respectively, shown in FIG. 4A. Although defect layers 405 are shown in FIG. 4E, note that the locales at which laser ablation takes place are confined to smaller regions that are typically at or near the street. FIGS. 4D and 4E also depict photonic device 400 after singulation is completed at 204 and/or 304. For example, for stealth dicing, the dicing tape has been expanded in the direction(s) that result in the desired edges. Streets 430, 440, and 442 have been removed. Further, edge 460 has been formed. As can be seen in FIG. 4E, edge 460 is close to perpendicular to the top surface of substrate 404. For example, θ may be less than ten degrees. In some embodiments, θ is not more than five degrees. θ may be not more than three degrees. In some embodiments, θ is not more than three degrees. θ may be not more than two degrees or not more than one degree. In some embodiments, θ is not more than 0.5 degree. Although shown as substantially planar, edge 460 may have a long-range structure. For example, edge 460 may be curved or wavy. However, the short range surface roughness of at least electro-optic material(s) 410 at facet 462 for edge 460 may be in the ranges described herein. For example, the short range surface roughness of electro-optic material(s) 410 may be not more than ten nanometers.

Performance of and yield for fabrication of photonic device 400 may be improved. Edge(s) such as edge 460 may be very close to vertical. Further, the short range surface roughness of at least the electro-optic material(s) 410 at facet 462 may be low. Consequently, the optical losses due to coupling into and/or out of photonic device 400 may be low. The angle of edge 460 may also facilitate coupling of photonic device 400 to an optical fiber. Optical losses may thus be reduced. Consequently, performance of photonic device 400 may be enhanced.

Figure 5A:
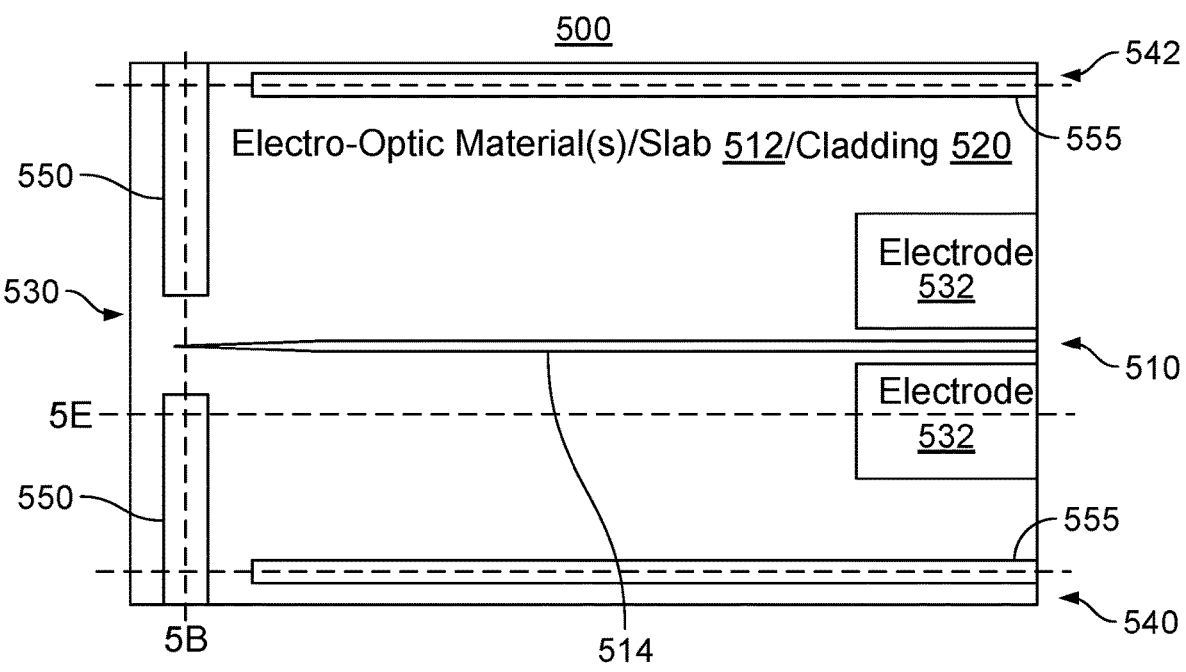
FIGS. 5A-5H are diagrams depicting embodiments of photonic devices during singulation.
Figure 5B:
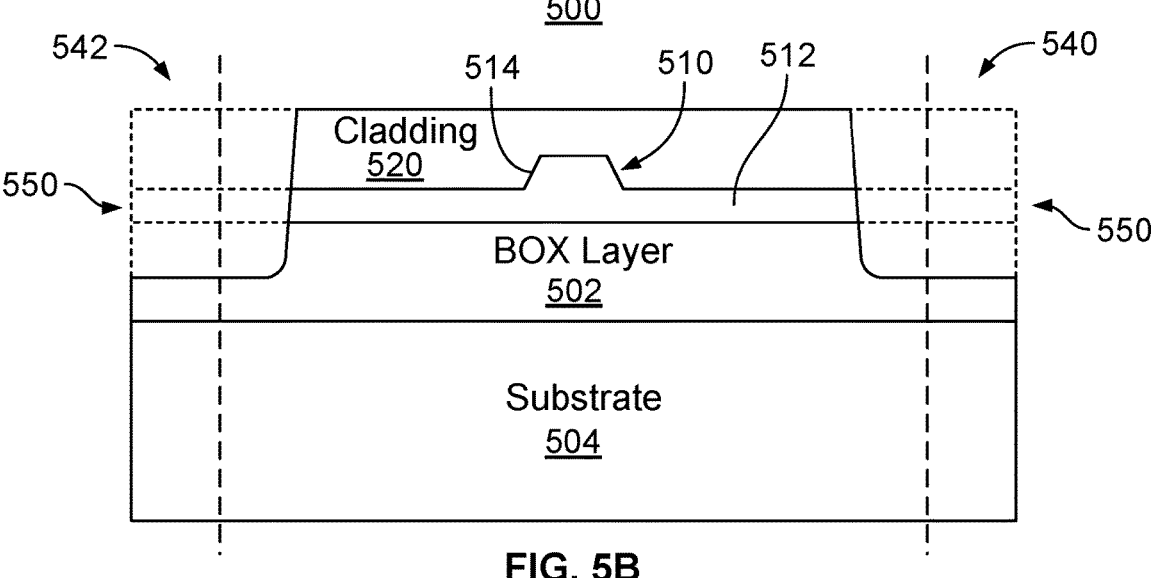
Figure 5C:
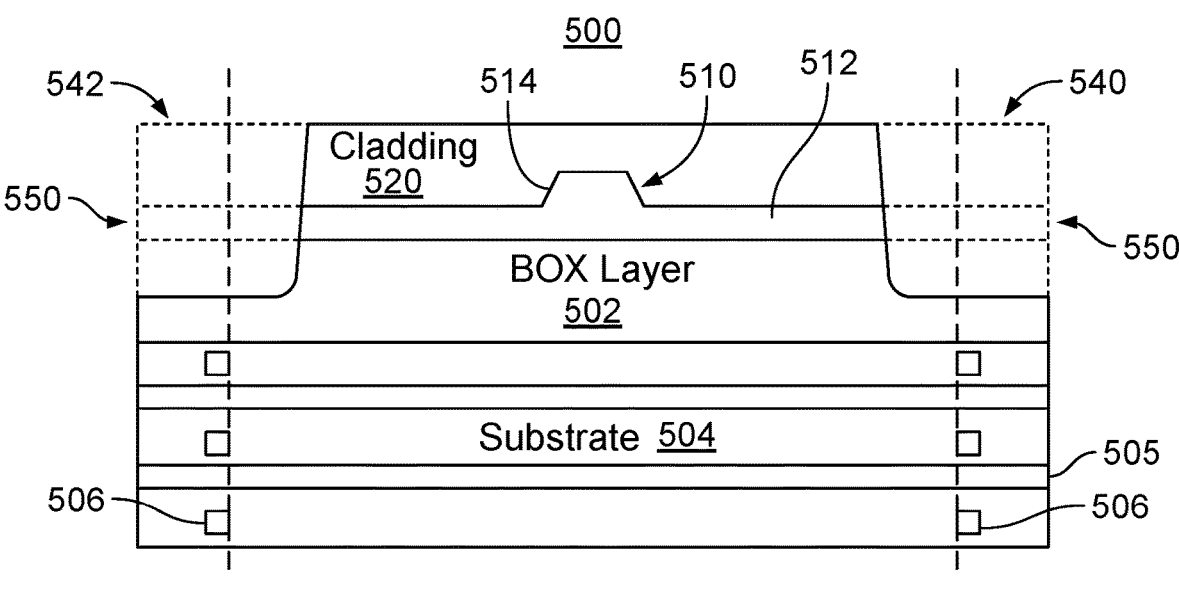
Figure 5D:
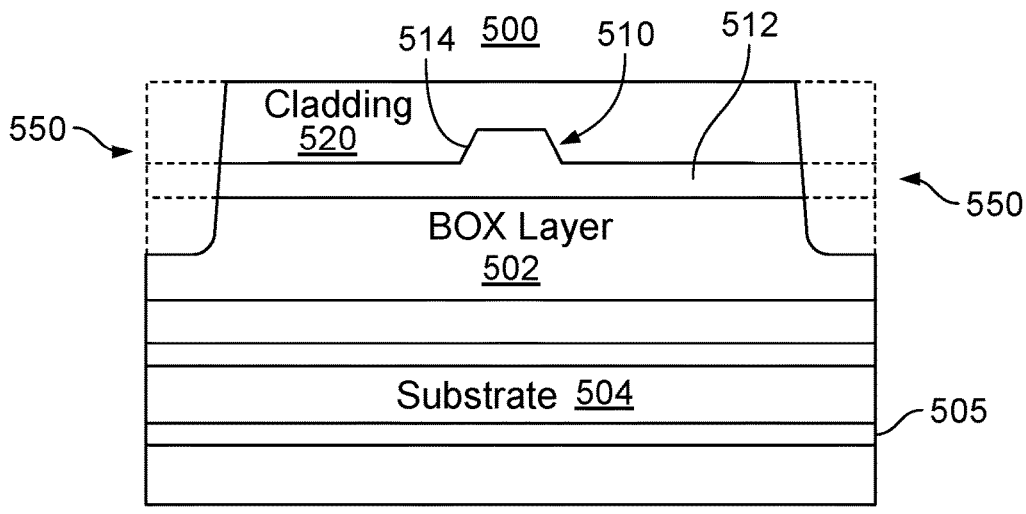
Figure 5E:
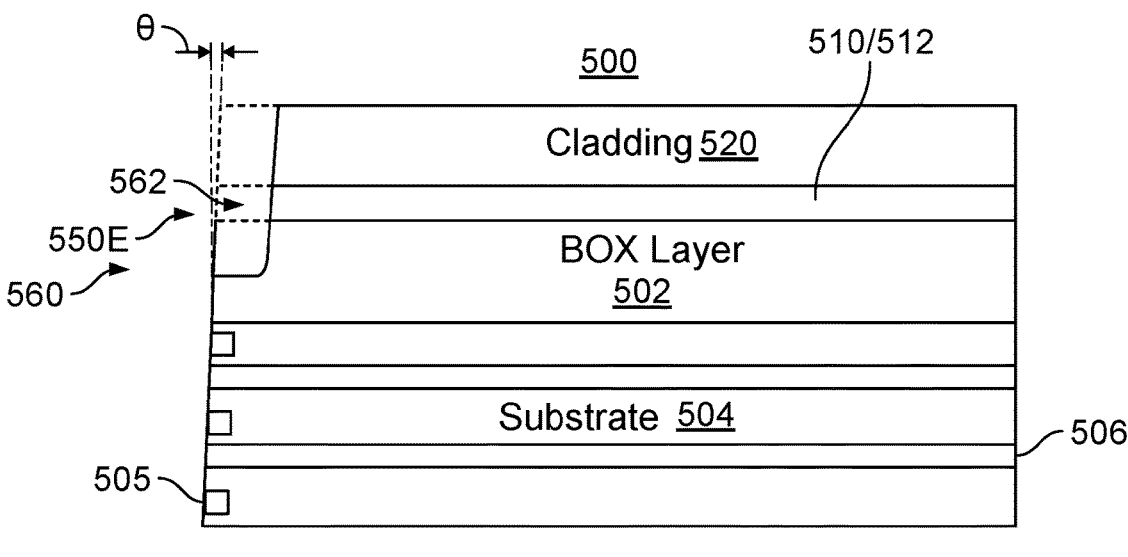
Figure 5F:
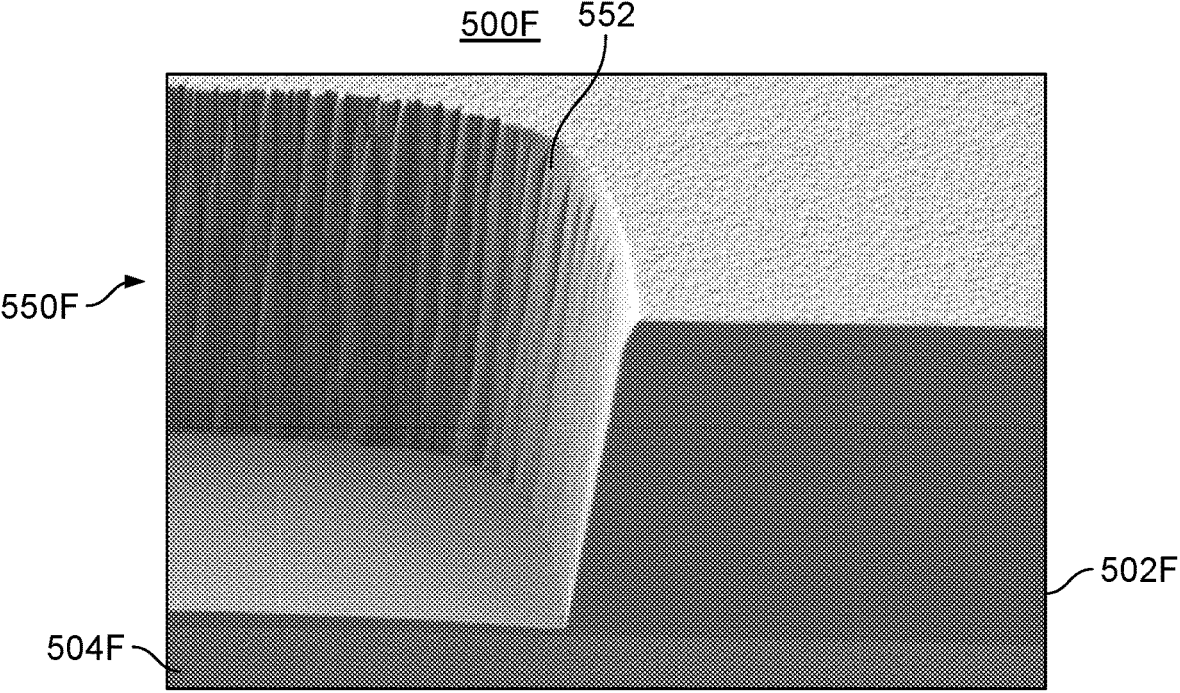
Figure 5G:
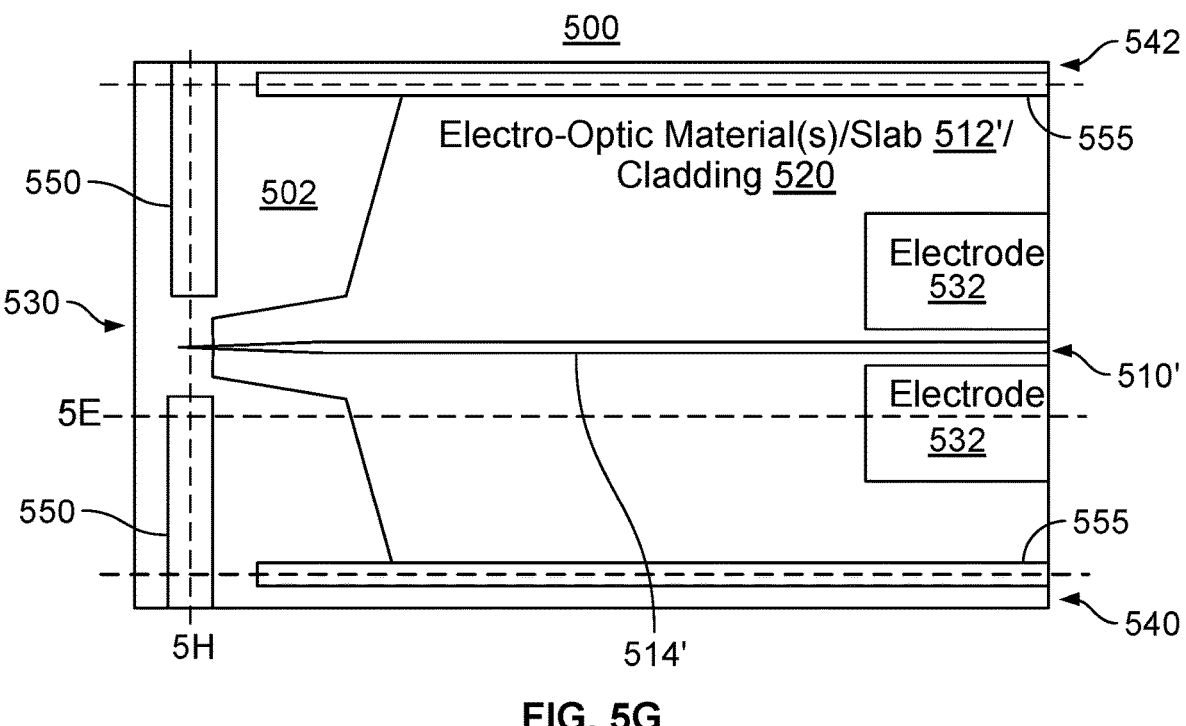
Figure 5H:
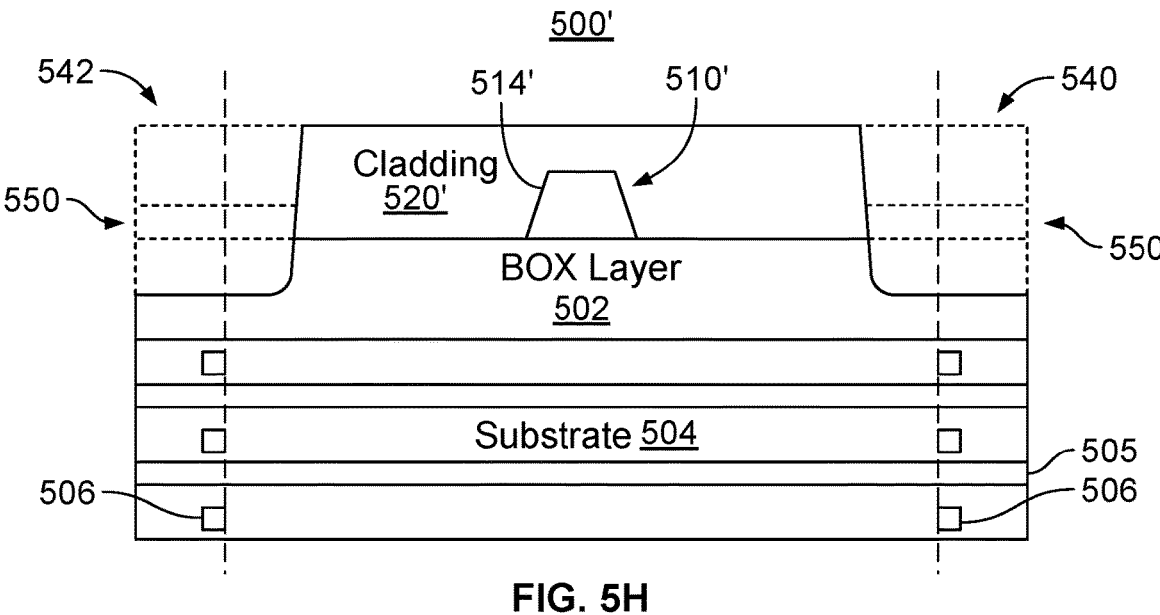

FIGS. 5A-5H are diagrams depicting an embodiment of photonic devices 500 and 500' during singulation using method(s) 200 and/or 300. FIG. 5E is a micrograph of a device. FIGS. 5A and 5B are a plan view and a cross-sectional view of photonic device 500 before stealth dicing starts. FIGS. 5B-5D are cross-sectional views of photonic device 500 taken along line 5B shown in FIG. 5A. FIG. 5E is a cross-sectional view of photonic device 500 taken along line 5E shown in FIG. 5A. FIGS. 5G-5H depict plan and cross-sectional views of photonic device 500'. For clarity, FIGS. 5A-5E and 5G-5H are not to scale and not all components of photonic device 500 are shown.

Photonic device 500 includes a substrate structure including BOX layer 502 and underlying substrate 504, which may be a silicon substrate. Photonic device 500 also includes electro-optic material(s) 510, cladding 520, and electrodes 532 that are analogous to electro-optic material(s) 410, cladding 420 and electrodes 432, respectively. Also shown in FIGS. 5A-5B are streets 530, 540, and 542, which are analogous to streets 430, 440, and 442, respectively. BOX layer 502 and substrate 504 are analogous to BOX layer 402 and substrate 404, respectively. However, substrate 504 has a thickness that is less than or (in some embodiments) equal to the threshold(s) described herein. For example, in some embodiments, substrate 504 has a thickness that is less than five hundred micrometers. In some such embodiments, substrate 504 has a thickness that is less than five hundred and fifty micrometers. Thus, process 302 of method 300 may be used to form trenches 550 and/or 555. In the embodiment shown, trenches 550 and 555 extend only partially through BOX layer 502. For example, trenches 550 and/or 555 may have depths of at least one micrometer, at least two micrometers, at least three micrometers or more. In some embodiments, trench(es) may extend through BOX layer 502. Trenches 550 and/or 555 may be used to guide the crack formed during singulation. Further, deeper trenches 550 and/or 555 may be used to reduce or eliminate overhangs and/or chipping for photonic device 500.

FIG. 5C depicts photonic device after stealth dicing or other singulation has commenced at 204 and/or 304. In particular, defect layers 505 (only one of which is labeled) have been created. In some embodiments, defect layers 505 have been formed by ablating layer(s) of substrate 504 with a laser. Defect layers (not shown in FIG. 5C) may also be created perpendicular to the surface shown in FIG. 5C. Defect layer 505 are, therefore, analogous to defect layers 405 of photonic device 400. In some embodiments, however, fewer defect layer 505 are present because substrate 504 is thinner than substrate 404. Stealth dicing or an analogous technique may be used to dice photonic device 500 in the region of streets 530, 540, and 542.

FIGS. 5D and 5E depict cross-sectional views of photonic device 500 along lines 5B and 5E, respectively, shown in FIG. 5A. Thus, FIG. 5E depicts defect layers 506 (of which only one is labeled). FIGS. 5D and 5E also depict photonic device 400 after singulation is completed at 204 and/or 304. For example, for stealth dicing, the dicing tape has been expanded in the direction(s) that result in the desired edges and facets. Streets 530, 540, and 542 have been removed. Further, edge 560 has been formed. As can be seen in FIG. 5E, edge 560 is close to perpendicular to the top surface of substrate 504. For example, θ may be in the ranges described for edge 460. Although shown as substantially planar, edge 560 may have a long-range structure. For example, edge 560 may be curved or wavy. However, the short range surface roughness of at least electro-optic material(s) 510 at facet 562 of edge 560 may be in the ranges described herein. For example, the short range surface roughness of electro-optic material(s) 510 may be not more than ten nanometers. Further, edge 560 includes recess 550E that corresponds to trench 550.

FIG. 5F is a micrograph of a portion of photonic device 500F that is analogous to photonic device 500. FIG. 5F is a cross-sectional view taken along a line analogous to 5B shown in FIG. 5A. Thus, FIG. 5F may be considered to provide a view of a portion of edge 560. Photonic device 500F includes silicon substrate 504F and BOX layer 502F. Also shown is trench 550F having sidewalls 552. As indicated by device 500F, the short range surface roughness of trench walls 552 is much larger than that of BOX layer 502F at the edge. Although in principle the etch that forms trench 550F might be tuned to reduce the short range surface roughness of trench sidewalls 552, this may be challenging in practice. Thus, in addition to improving yield, stealth dicing using method 300 or an analogous technique performed using method 200 may more readily result in a facet having the desired surface roughness. Thus, yield and fabrication of photonic device 500 may be improved.

Similarly, FIGS. 5G-5H depict plan and cross-sectional views of photonic device 500'. Photonic device 500' is analogous to photonic device 500. Photonic device 500' thus includes substrate 504 having defect layers 505 and 506, BOX layer 502, electro-optic material(s) 510' including slab 512' and ridge waveguide 514', cladding 520', electrodes 532, and trenches 550 that are analogous to substrate 504 having defect layers 505 and 506, BOX layer 502, electro-optic material(s) 510 including slab 512 and ridge waveguide 514, cladding 520, electrodes 532, and trenches 550, respectively, of photonic device 500. Thus, FIGS. 5G-5H depict photonic device 500' after 302 and a portion of 304 has been performed. Further, dashed line 5H corresponds to a surface analogous to that indicated by dashed line 5B in FIG. 5A. FIG. 5H is analogous to FIG. 5C. Consequently, photonic device 500' has not been singulated from other devices (not shown).

In photonic device 500', waveguide 504' has been configured as a mode converter near the edge indicated by dashed line 5H. Thus, electro-optic material(s) 510' have been configured such that slab portion 512' terminates away from the edge corresponding to dashed line 5H. Thus, the portion of waveguide 514' at the facet for the edge is a channel waveguide. In some embodiments, the width of the slab at the facet is 500 nanometers or less. In other embodiments, the width of the slab at the facet is 200 nanometers or less. In some embodiments, the thickness of the slab at the facet is 600 nanometers or less. In other embodiments, the thickness of the slab at the facet is 200-300 nanometers or less.

Performance of and yield for fabrication of photonic device(s) 500 and/or 500' may be improved. Edge(s) such as edge 560 may be very close to vertical. Further, the short range surface roughness of at least the electro-optic material(s) 510 at the facet may be low. Consequently, the optical losses due to coupling into and/or out of photonic device(s) 500 and/or 500' may be low. The angle of the edge may also facilitate coupling of the photonic device to an optical fiber. Optical losses may thus be reduced. Trenches 550 and/or 555 may also reduce or eliminate overhangs, chipping, and/or other issues that may be present in photonic device 500. Consequently, performance of and yield for photonic device 500 may be enhanced. Further, although devices 500 and 500' indicate that the streets 530, 540, and 542 are removed, in some embodiments, one or more of these streets may remain. As a result, structures that may be used in fabrication and/or use of device 500 and/or 500' may be formed in the street. For example, optical and/or electrical test structures may be formed in the street. In addition, optical and/or electrical connection may be formed in the street. For example, a connection to a neighboring photonic device may be placed in the street and the street not removed. Thus, two neighboring photonic devices may be fabricated together and electrical and/or optical signals exchanged via the street.

Figure 6:
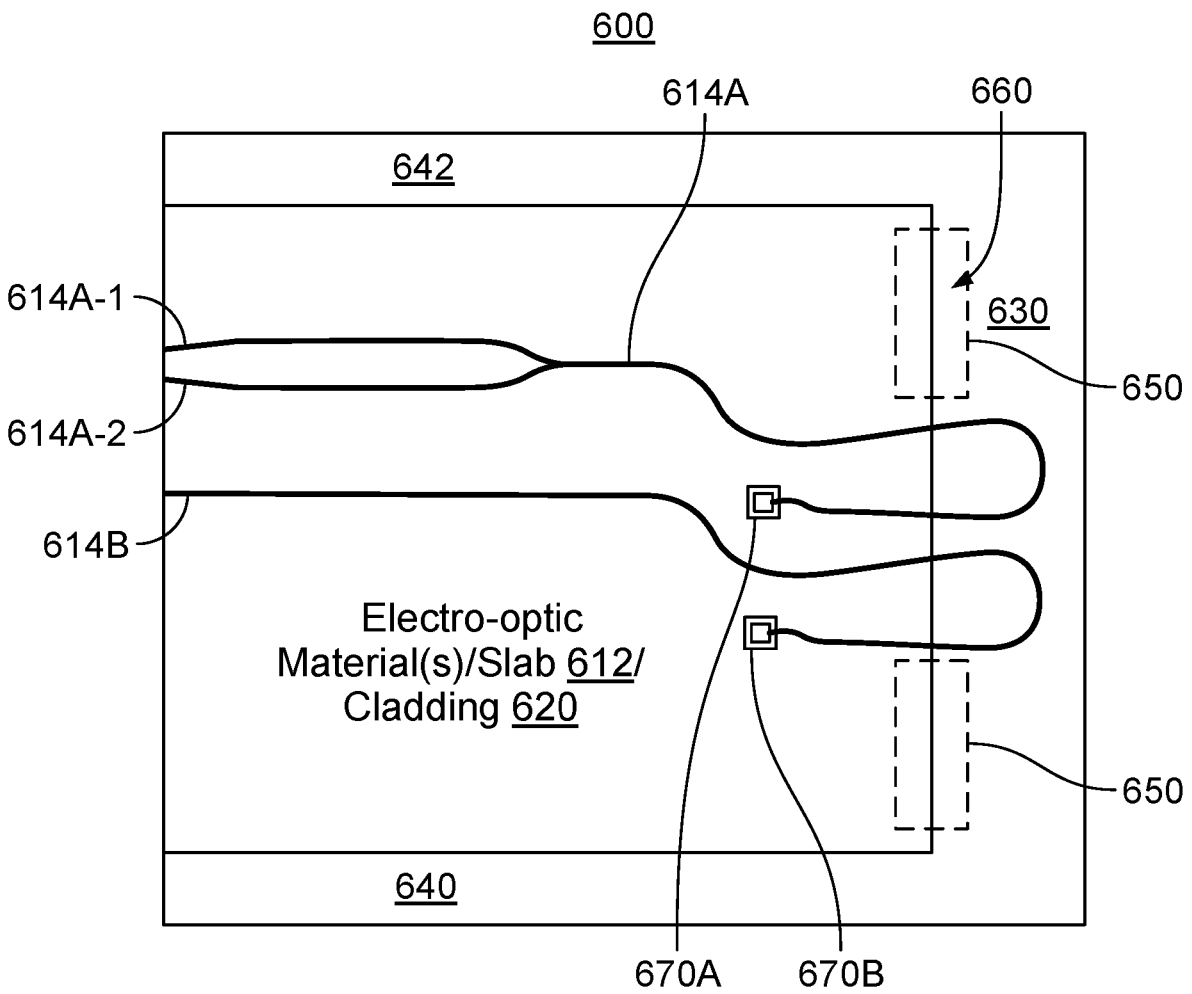
FIG. 6 is a diagram depicting an embodiment of a photonic device having test structures during fabrication.

FIG. 6 is a diagram depicting a plan view of an embodiment of photonic device 600 during singulation using method(s) 200 and/or 300. For clarity, FIG. 6 is not to scale and not all components of photonic device 600 are shown. Photonic device 600 is analogous to photonic device(s) 400 and/or 500. Photonic device 600 includes a substrate structure including a BOX layer (not shown) and an underlying substrate (not shown), which may be a silicon substrate. Photonic device 600 also includes electro-optic material(s) 610 and cladding 620 that are analogous to electro-optic material(s) 410 and/or 510 and cladding 420 and/or 520. Also shown are streets 630, 640, and 642 that are analogous to streets 430, 440, and 442 and/or 530, 540, and 542. In the embodiment shown, photonic device 600 has trenches 650. Stated differently, process 302 of method 300 may be used to form trenches 650. In some embodiments, trenches 650 may be omitted.

Electro-optic material(s) 610 include slab 612 and ridge waveguides 614A and 614B. In some embodiments, electro-optic material(s) 610 may be configured differently. In the embodiment shown, ridge waveguide 614A includes portions 614A-1 and 614A-2, which combine close to surface 660 at which a edge is to be formed. Also shown are output couplers 670A and 670B for waveguides 614A and 614B, respectively. For example, output couplers 670A and 670B may be grating couplers. In the embodiment shown, output couplers 670A and 670B are not physically or optically coupled to the remaining portions of waveguides 614A and 614B, respectively, after formation of photonic device 600 is completed. This is because street 630, and the portions of waveguides 614A and 614B therein, will have been removed. However, trenches 650 have been placed such that the portions of waveguides 614A and 614B at edge 660 remain until singulation is completed. As a result, waveguides 614A and 614B may be tested until singulation is completed. Consequently, photonic device 600 may be tested to ensure that waveguides 614A and 614B have not been damaged during fabrication or transportation to the location at which singulation is performed. In some embodiments, waveguide(s) and/or electrical connection(s) may extend to another photonic device. For example, waveguide 614B might extend through street 630 to another photonic device (not shown). Thus, circuits can extend past a single reticle or photonic device. Signals may be routed through street 630 to the adjacent photonic device.

Photonic device 600 may share the benefits of photonic device(s) 400, 500, and/or 500'. Further, because of judicious placement of trenches 650, in addition to having reduced surface roughness, waveguides 614A and 614B may be tested later in fabrication. As a result, photonics device 600 may have improved performance. Further, optical and/or electrical signals may be routed through street 630, 640, and/or 642 to adjacent photonic device(s). Instead, longer structures may be provided. Singulation may also be more precise, for example due to the use of trenches 650. Thus, less of the underlying wafer may be wasted.

Figure 7:
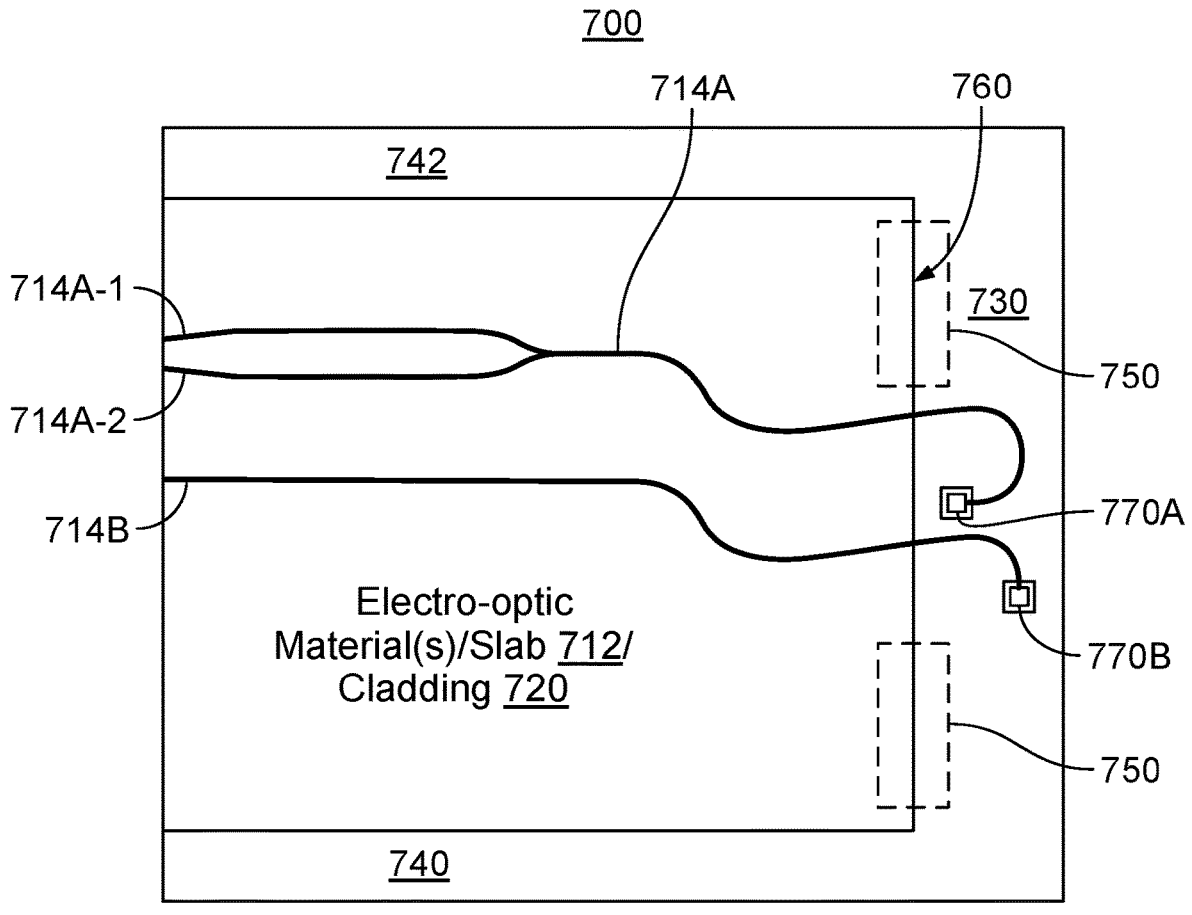
FIG. 7 is a diagram depicting an embodiment of a photonic device having test structures during fabrication.

FIG. 7 is a diagram depicting an embodiment of photonic device 700 during fabrication. More specifically, FIG. 7 depicts photonic device 700 during singulation using method(s) 200 and/or 300. For clarity, FIG. 7 is not to scale and not all components of photonic device 700 are shown. Photonic device 700 is analogous to photonic device 600. Photonic device 700 includes a substrate structure including a BOX layer (not shown) and an underlying substrate (not shown), which may be a silicon substrate. Photonic device 700 also includes electro-optic material(s) 710 and cladding 720 that are analogous to electro-optic material(s) 610 and cladding 620. Also shown are streets 730, 740, and 742 that are analogous to streets 630, 640, and 642. In the embodiment shown, photonic device 700 has a substrate that is sufficiently thin that trenches 750 are included. Stated differently, process 302 of method 300 may be used to form trenches 750. In some embodiments, trenches 750 may be omitted.

Electro-optic material(s) 710 include slab 712 and ridge waveguides 714A and 714B. In some embodiments, electro-optic material(s) 710 may be configured differently. In the embodiment shown, ridge waveguide 714A includes portions 714A-1 and 714A-2, which combine close to surface 760 at which a edge is to be formed. Also shown are output couplers 770A and 770B for waveguides 714A and 714B, respectively. For example, output couplers 770A and 770B may be grating couplers. In the embodiment shown, output couplers 770A and 770B are not present after formation of photonic device 700 is completed. This is because street 730 will have been removed. However, trenches 750 have been placed such that output couplers 770A and 770B remain coupled with waveguides 714A and 714B at edge 760 until singulation is completed. As a result, waveguides 714A and 714B may be tested until singulation is completed. Consequently, photonic device 700 may be tested to ensure that waveguides 714A and 714B have not been damaged during fabrication or transportation to the location at which singulation is performed.

Photonic device 700 may share the benefits of photonic device(s) 400, 500, 500', and/or 600. Further, because of placement of trenches 750, in addition to having reduced surface roughness at the facet for edge 760, waveguides 714A and 714B may be tested later in fabrication. As a result, photonics device 700 may have improved performance. Singulation may also be more precise, for example due to the use of trenches 750. Thus, less of the underlying wafer may be wasted.

Figure 8:
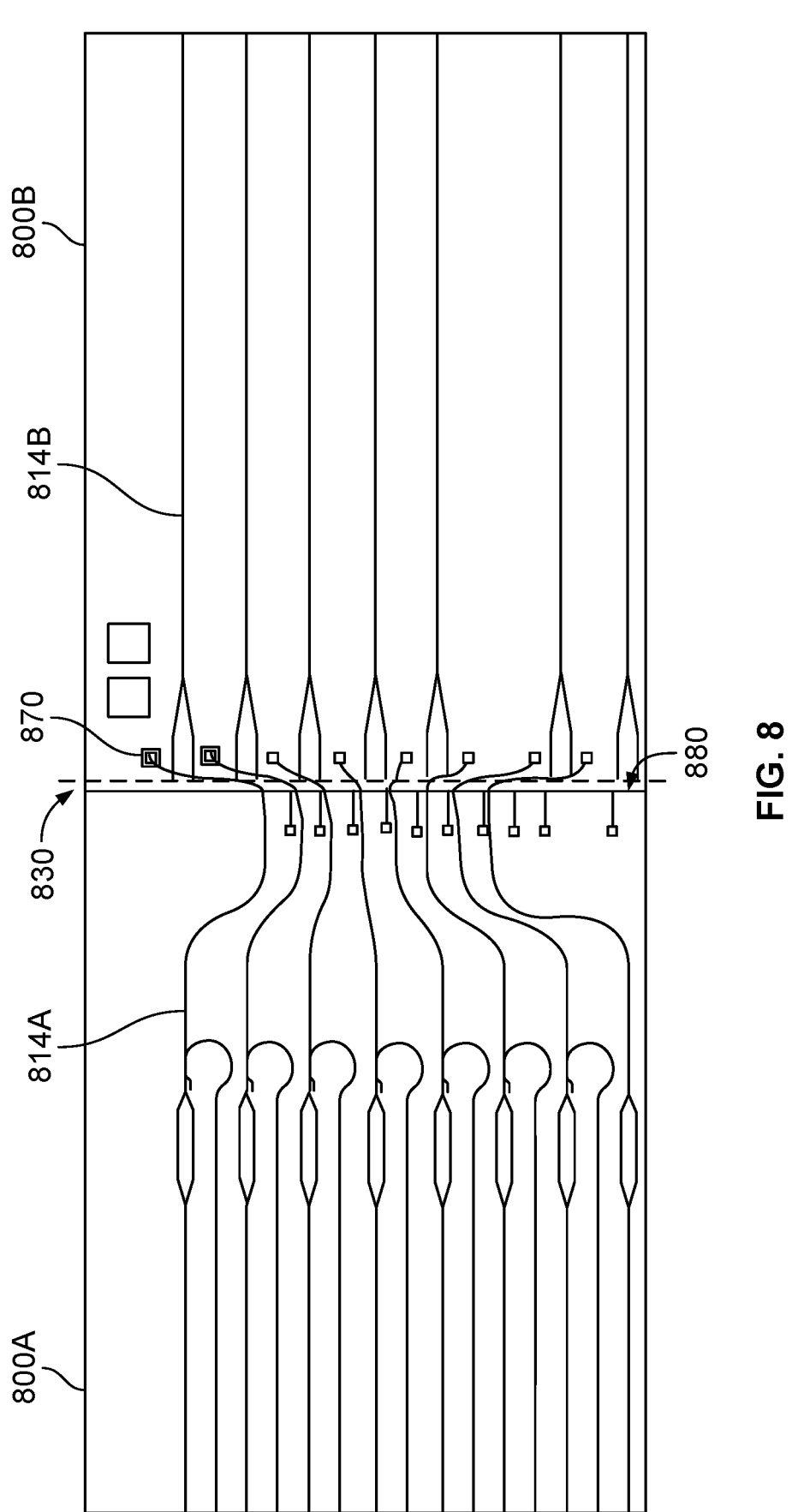
FIG. 8 is a diagram depicting an embodiment of a photonic device having test structures during fabrication.

FIG. 8 is a diagram depicting embodiments of photonic devices 800A and 800B during fabrication. For clarity, FIG. 8 is not to scale and not all components of photonic devices 800A and 800B are shown. For example, electrodes are not shown. Photonic devices 800A and 800B are analogous to photonic device(s) 600 and/or 800. Photonic devices 800A and 800B each includes a substrate structure including a BOX layer (not shown) and an underlying substrate (not shown), which may be a silicon substrate, electro-optic material(s) and cladding that are analogous to electro-optic material(s) 610 and/or 710 and cladding 620 and/or 720. Also shown is street 830 that is analogous to streets 630 and 730. In some embodiments, street 830 may be relatively small (e.g. fifty micrometers or less in width). Although not explicitly depicted in FIG. 8, trenches such as those analogous to trenches 650 and/or 750 may be used. Singulation is desired to occur at the left side of street 830, at edge 880. Thus, trenches may be placed in this region. However, such trenches are also desired to avoid regions corresponding to facets for waveguides 814A. In other embodiments, such trenches may be omitted. Thus, singulation of devices 800A and 800B may be improved.

Photonic devices 800A and 800B include waveguides 814A and 814B, respectively. For clarity, only one waveguide in each photonic device 800A and 800B is labeled. The waveguides may be ridge and/or channel waveguides. Also shown are output couplers 870 for waveguides 813A. Output couplers 870 reside on a different photonic device 800B than the photonic device 800A on which the corresponding waveguide 814A resides. Thus, optical signals may be stitched across from one photonic device 800A to the other photonic device 800B. Thus, waveguides 814A are extended from photonic device 800A to photonic device 800B. The devices (e.g. mode converters) corresponding to waveguides 814A may be tested using grating couplers 870 on photonic device 800B. Because street 830 remains part of photonic device 800B, elements such as radio frequency (RF) pads on photonic device may be extended into street 830. Thus, such RF pads may be closer to waveguides 814B, thereby improving signal. However, such structures may still be desired to be recessed from edge 880, for example to allow for tolerances for stealth dicing (e.g. ±5 micrometers or ±10 micrometers). Recessing structures in photonic device 800B from edge 880 allows for stealth dicing without the structures (e.g. the RF pad) inadvertently becoming part of photonic device 800A due to errors in stealth dicing. As indicated, waveguides 814A may be configured such that an error in stealth dicing resulting in some of waveguides 814A near edge 880 being removed does not affect performance.

Photonic device 800 may share the benefits of photonic device(s) 400, 500, 500', 600, and/or 700. Further, because of placement of trenches (not shown), in addition to having reduced surface roughness at the facets for waveguides 814A, structures can extend into neighboring dies to facilitate testing. As a result, photonics devices 800A and/or 800B may have improved performance.

Although various components and methods have been described, one of ordinary skill in the art will recognize that the components and processes of methods may be combined in manners not explicitly described herein. For example, another number of waveguides, other electro-optic devices, and/or placement of output couplers both in the street and in the final photonic device may be possible.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A photonic device, comprising:

a substrate;

an oxide layer of at least one micrometer on the substrate;

an electro-optic device residing on the oxide layer and including an electro-optic material having a first thickness of not more than one micrometer, the substrate, the oxide layer, and the electro-optic material terminating at an edge, wherein the electro-optic device is singulated from an electro-optic device of another photonic device, wherein the photonic device is a neighbor of the other photonic device, wherein a street corresponding to a region is located between the edge of the photonic device and an edge of the other photonic device, wherein a plurality of trenches are located in the street before the singulating operation is performed, wherein the plurality of trenches are located at or near an edge of the street;

wherein the substrate has a third thickness of at least five hundred micrometers;

wherein the edge includes a recessed region corresponding to a portion of the oxide layer; and wherein the recessed region has a second thickness, the second thickness being less than the first thickness.

2. The photonic device of claim 1, wherein a portion of the electro-optic material at the edge is distinct from the recessed region.

3. The photonic device of claim 1, wherein the edge has an angle of at least eighty degrees and not more than one hundred degrees from a top surface of the substrate.

4. The photonic device of claim 1, wherein the substrate includes a plurality of defect layers intersecting the edge of the photonic device.

5. The photonic device of claim 1, wherein the electro-optic device includes a waveguide.

6. The photonic device of claim 1, wherein a facet at the edge has a short range surface roughness of not more than ten nanometers.

7. The photonic device of claim 1, wherein the electro-optic material includes at least one of lithium niobate and lithium tantalate.

8. The photonic device of claim 1, wherein the edge has an angle of at least 85 degrees and not more than 90 degrees from a top surface of the substrate.

9. A photonic device, comprising:

a substrate;

an oxide layer on the substrate;

an electro-optic device residing on the oxide layer and including an electro-optic material having a first thickness of not more than one micrometer, wherein the electro-optic device is singulated from an electro-optic device of another photonic device, wherein the photonic device is a neighbor of the other photonic device, wherein a street corresponding to a region is located between the edge of the photonic device and an edge of the other photonic device, wherein a plurality of trenches are located in the street before the singulating operation is performed, wherein the plurality of trenches are located at or near an edge of the street; and wherein the substrate, oxide layer, and electro-optic material terminate at an edge, the edge being at an angle of at least eighty degrees and not more than one hundred degrees from a top surface of the substrate;

wherein the edge includes a recessed region corresponding to a portion of the oxide layer; and wherein the recessed region has a second thickness, the second thickness being less than the first thickness.

10. The photonic device of claim 9, wherein of the substrate has a third thickness of at least five hundred micrometers.

11. The photonic device of claim 10, wherein the edge includes the recessed region and wherein a portion of the electro-optic material at the edge is distinct from the recessed region.

12. The photonic device of claim 11, wherein the recessed region corresponds to a trench in the oxide layer.

13. The photonic device of claim 9, wherein the substrate includes a plurality of defect layers intersecting the edge.

14. The photonic device of claim 9, wherein a facet at the edge has a short range surface roughness of not more than ten nanometers.

15. The photonic device of claim 9, wherein the electro-optic material includes at least one of lithium niobate and lithium tantalate.

16. A method, comprising:

determining a fourth thickness of a substrate of a photonic device including an electro-optic device on a substrate structure, the substrate structure including the substrate and an oxide layer on the substrate, the electro-optic device residing on the oxide layer and including an electro-optic material having a first thickness of not more than one micrometer; and singulating the electro-optic device from an electro-optic device of another photonic device to provide an edge for the electro-optic device based on the first thickness, the substrate, the oxide layer, and the electro-optic material terminating at the edge, wherein the photonic device is a neighbor of the other photonic device, wherein a street corresponding to a region is located between the edge of the photonic device and an edge of the other photonic device, wherein a plurality of trenches are located in the street before the singulating operation is performed, wherein the plurality of trenches are located at or near an edge of the street, the singulating further including stealth dicing the substrate structure;

wherein the substrate has a third thickness of at least five hundred micrometers;

wherein the edge includes a recessed region corresponding to a portion of the oxide layer; and wherein the recessed region has a second thickness, the second thickness being less than the first thickness.

17. The method of claim 16, wherein the singulating further results in the edge being at an angle of at least eighty degrees and not more than one hundred degrees from a top surface of the substrate.

18. The method of claim 16, further comprising:

forming a trench in the oxide layer for the second thickness being less than five hundred micrometers, the recessed region corresponding to the trench.

19. The method of claim 16, wherein the stealth dicing further includes:

forming a plurality of defect layers intersecting the edge.

20. The method of claim 16, wherein a facet at the edge has a short range surface roughness of not more than ten nanometers.

21. The method of claim 16, wherein the electro-optic material includes at least one of lithium niobate and lithium tantalate.

* * * * *